US010024228B2

(12) United States Patent
Gong et al.

(10) Patent No.: US 10,024,228 B2
(45) Date of Patent: Jul. 17, 2018

(54) COMPRESSOR RECIRCULATION VALVE WITH NOISE-SUPPRESSING MUFFLER

(71) Applicant: Honeywell International Inc., Morris Plains, NJ (US)

(72) Inventors: Yunbin Gong, Shanghai (CN); Haibin Wang, Shanghai (CN); Guangqing Zheng, Shanghai (CN); Gaofeng Liu, Shanghai (CN); Ling Wang, Shanghai (CN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/256,627

(22) Filed: Sep. 5, 2016

(65) Prior Publication Data

US 2017/0101924 A1    Apr. 13, 2017

Related U.S. Application Data

(60) Provisional application No. 62/238,748, filed on Oct. 8, 2015.

(51) Int. Cl.
*F02B 37/12*    (2006.01)

(52) U.S. Cl.
CPC .................................. *F02B 37/12* (2013.01)

(58) Field of Classification Search
CPC ....... F02B 37/16; F02B 37/12; F04D 27/0215
USPC ............. 60/602, 611; 415/119; 181/252, 256
See application file for complete search history.

(56) References Cited

U.S. PATENT DOCUMENTS

| 5,173,021 | A | * | 12/1992 | Grainger | ................. F02B 37/16 |
|  |  |  |  |  | 181/252 |
| 7,017,706 | B2 | * | 3/2006 | Brown | .................... F01D 25/30 |
|  |  |  |  |  | 181/222 |
| 2008/0056882 | A1 | * | 3/2008 | Clay | ........................ F02C 6/12 |
|  |  |  |  |  | 415/55.6 |
| 2011/0085902 | A1 | * | 4/2011 | Yin | ..................... F04D 29/4213 |
|  |  |  |  |  | 415/208.2 |

FOREIGN PATENT DOCUMENTS

| CN | 104389677 A | 3/2015 |
| DE | 102009011938 B3 | 9/2010 |
| EP | 0468676 A1 | 1/1992 |
| JP | 2009209976 A | 9/2009 |
| JP | 2011227844 A | 11/2011 |
| WO | 2005042941 A1 | 5/2005 |

OTHER PUBLICATIONS

Search Report and Written Opinion from the EPO for Appl. No. 16192294.3-1607, dated Mar. 3, 2017.

* cited by examiner

*Primary Examiner* — Jason Newton
(74) *Attorney, Agent, or Firm* — John C. James

(57) ABSTRACT

A compressor recirculation valve having a noise-suppressing muffler. The muffler has a double-walled construction, including a perforated outer wall and a non-perforated inner wall. The muffler is arranged surrounding the RCV such that when the RCV valve member is in an open position, compressed recirculation air is constrained to flow along the non-perforated inner wall and past an upper end thereof before reaching and flowing radially outwardly through the perforated outer wall to a transverse flow passage for delivery back into an inlet of the compressor.

4 Claims, 4 Drawing Sheets

COMPRESSOR RECIRCULATION VALVE WITH NOISE-SUPPRESSING MUFFLER

BACKGROUND OF THE INVENTION

This application relates generally to turbochargers for internal combustion engines, and more particularly relates to recirculation valves used with the turbocharger compressor for allowing some portion of the already-compressed air from the compressor discharge to be recirculated back to the compressor inlet.

Using a recirculation valve (RCV) with a turbocharger compressor to recirculate a portion of the already-compressed air back to the compressor inlet is a generally known strategy for delaying the onset of surge of the compressor to a lower flow rate at a given pressure ratio, or to a higher pressure ratio at a given flow rate. One drawback of the RCV, however, is that it tends to be a source of aerodynamically induced noise.

SUMMARY OF THE DISCLOSURE

An objective of the present invention is to at least partially alleviate the problem of RCV noise. The present disclosure describes a compressor recirculation valve having a noise-suppressing muffler. The muffler has a double-walled construction, including a perforated outer wall and a non-perforated inner wall. The muffler is arranged surrounding the RCV such that when the RCV valve member is in an open position, compressed recirculation air is constrained to flow along the non-perforated inner wall and past an upper end thereof before reaching and flowing radially outwardly through the perforated outer wall to a transverse flow passage for delivery back into an inlet of the compressor.

In accordance with an embodiment of the invention, a recirculation valve for a turbocharger compressor comprises:

a valve housing defining an axial flow passage for compressed recirculation air extending along a direction defined by an axis of the recirculation valve, a generally annular valve seat encircling the axis, an annular cavity surrounding the axial flow passage, the annular cavity being in fluid communication with the axial flow passage, and a transverse flow passage in fluid communication with the annular cavity;

a valve member disposed in the axial flow passage and linearly movable along the axis between a closed position wherein an end of the valve member contacts the valve seat, and an open position wherein the end of the valve member is axially spaced from the valve seat; and a muffler disposed in the annular cavity, the muffler comprising a body defining:

an annular flange at a first end of the body and encircling the axis;

a generally cylindrical, perforated outer wall extending axially from the flange and terminating at an opposite second end of the body;

an annular end wall joined to an end of the outer wall at the second end of the body, the end wall extending radially inwardly from the end of the outer wall and terminating at a radially inner periphery of the end wall; and a generally cylindrical, non-perforated inner wall joined to the inner periphery of the end wall and axially extending toward the first end of the body and terminating at an upper end located intermediate the first and second ends of the body;

In accordance with the embodiment of the invention described herein, the muffler is disposed such that when the valve member is in the open position, the compressed recirculation air is constrained to flow along the non-perforated inner wall and past the upper end thereof before reaching and flowing radially outwardly through the perforated outer wall to the transverse flow passage.

In one embodiment the annular end wall of the muffler is perforated. In another embodiment it is non-perforated.

The valve housing defines a chamber for receiving compressed air to be recirculated, the chamber being connected to the axial flow passage. In one embodiment the valve housing further defines a volute for the compressor.

BRIEF DESCRIPTION OF THE DRAWINGS

Having described the present disclosure in general terms, reference will now be made to the accompanying drawing(s), which are not necessarily drawn to scale, and wherein.

DETAILED DESCRIPTION OF THE DRAWINGS

The present disclosure will now be described in fuller detail with reference to the above-described drawings, which depict some but not all embodiments of the invention(s) to which the present disclosure pertains. These inventions may be embodied in various forms, including forms not expressly described herein, and should not be construed as limited to the particular exemplary embodiments described herein. In the following description, like numbers refer to like elements throughout.

Figure 1:
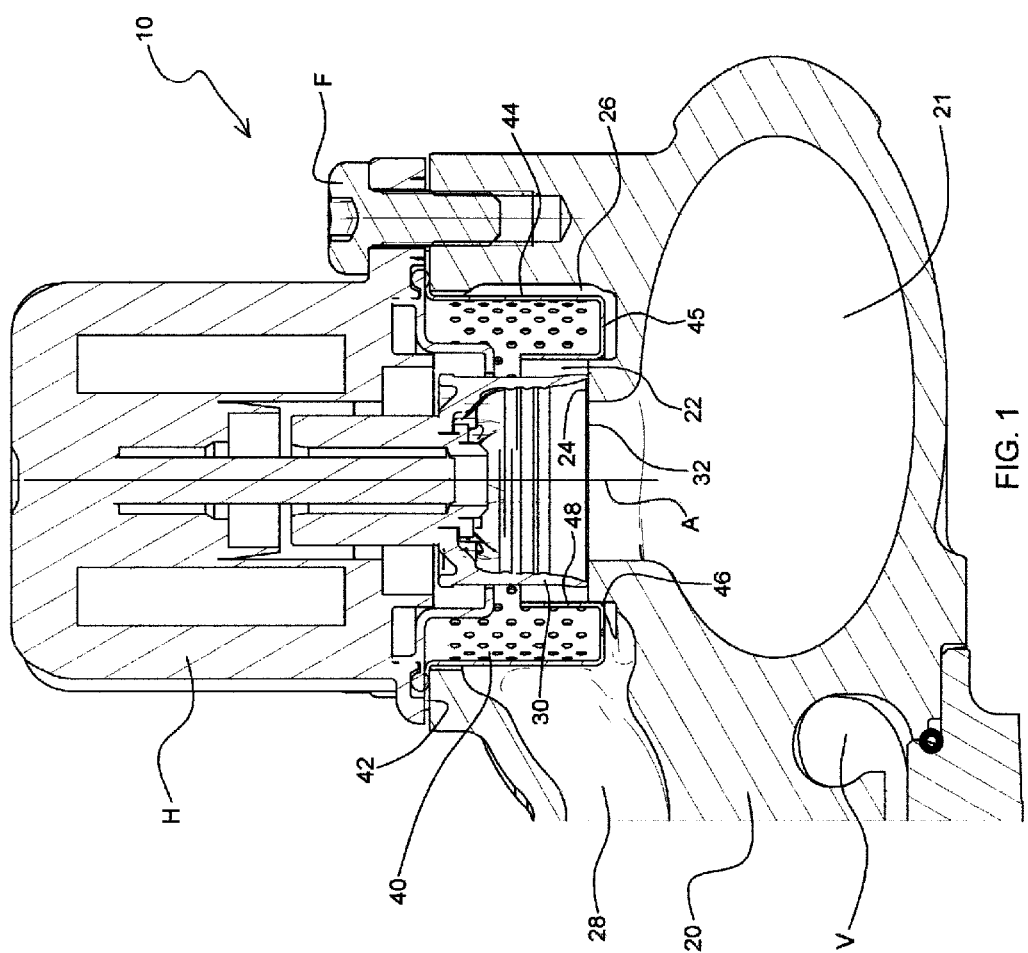
FIG. 1 is a cross-sectional view of an assembly comprising a turbocharger compressor and recirculation valve (RCV) in accordance with one embodiment of the invention, with the RCV in the closed position.

FIG. 1 is a cross-sectional view of a compressor recirculation valve (RCV) 10 for use with a compressor (not shown) of a turbocharger. The RCV includes a valve housing 20 defining an axial flow passage 22 for compressed recirculation air, the passage 22 extending along a direction defined by an axis A of the recirculation valve. The valve housing further defines a generally annular valve seat 24 encircling the axis, and an annular cavity 26 surrounding the axial flow passage 22, the annular cavity being in fluid communication with the axial flow passage. The valve housing further defines a transverse flow passage 28 in fluid communication with the annular cavity 26.

The RCV includes a valve member 30 disposed in the axial flow passage 22. The valve member is linearly movable along the axis A between a closed position (FIG. 1) wherein an end 32 of the valve member contacts the valve seat 24, and an open position (FIG. 2) wherein the end of the valve member is axially spaced from the valve seat. Various mechanisms for effecting the movement of the valve member can be used in the practice of the invention. For instance, pneumatic actuation or electrical actuation can be employed, as two non-limiting examples.

The construction of the housing for the valve actuator can take various forms in the practice of the invention. In the illustrated embodiment, a separate actuator housing H contains the mechanism that actuates the valve member 30, and the actuator housing H is fastened to the valve housing 20 by fasteners F. Alternatively, the actuator housing and valve housing can be formed together integrally.

Figure 2:
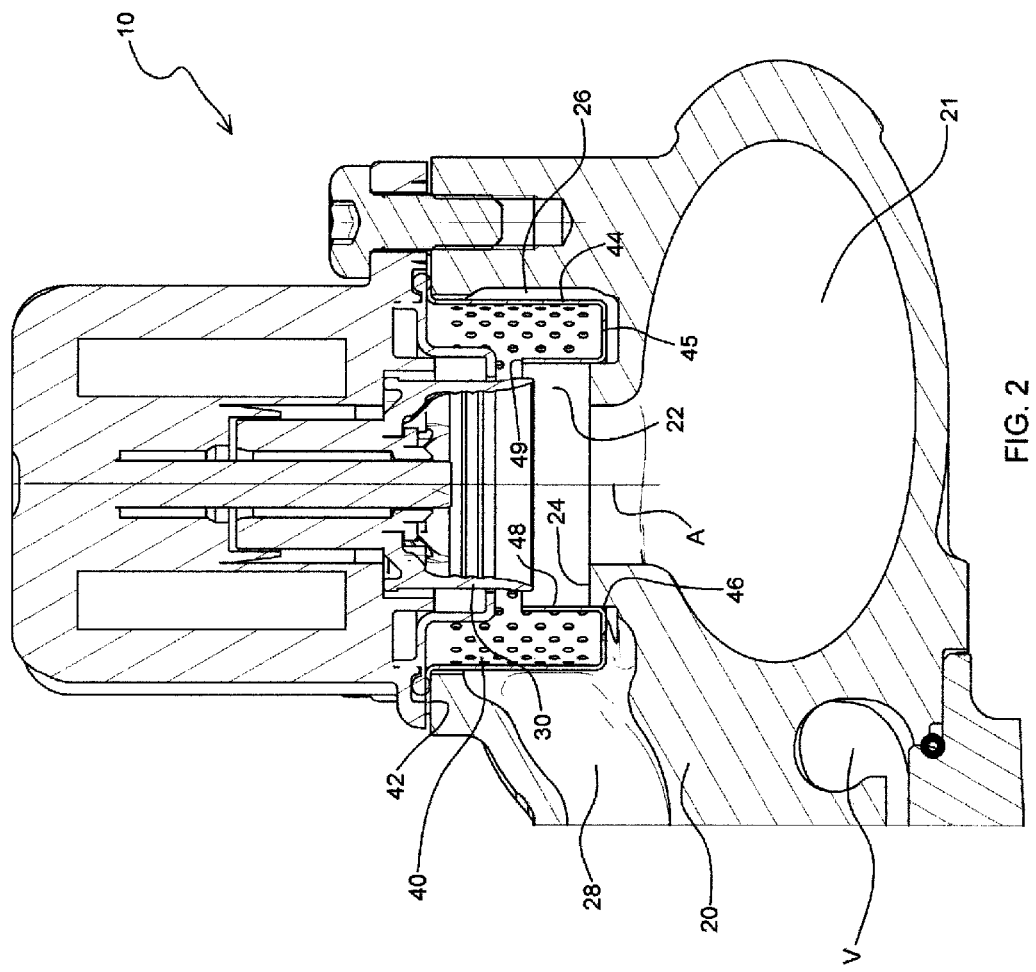
FIG. 2 is similar to FIG. 1 but shows the RCV in the open position.

The valve housing 20 defines a chamber 21 for receiving compressed air discharged from the compressor. The chamber 21 is connected to the axial flow passage 22. When the valve member is in the open position, recirculation air from the chamber 21 can flow through the passage 22 via a space created between the end 32 of the valve member and the valve seat 24, as best seen in FIG. 2.

Figure 3:
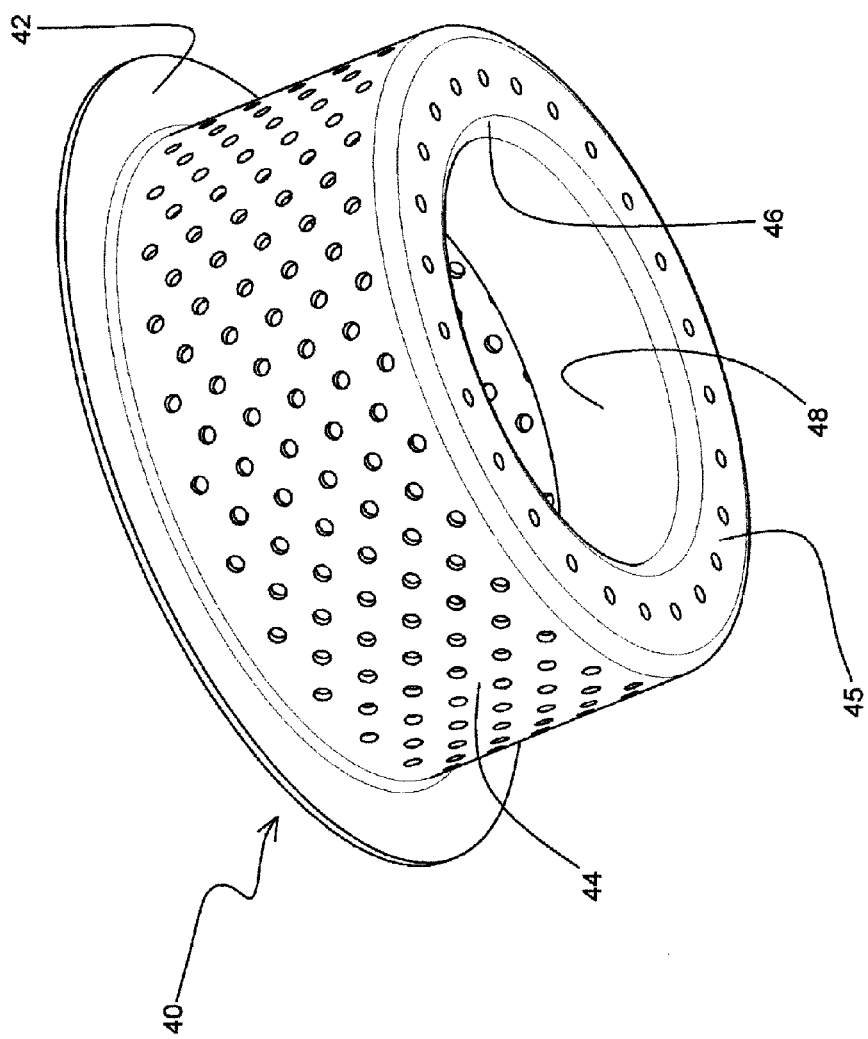
FIG. 3 is a perspective view of the muffler used in the assembly of FIGS. 1 and 2.
Figure 4:
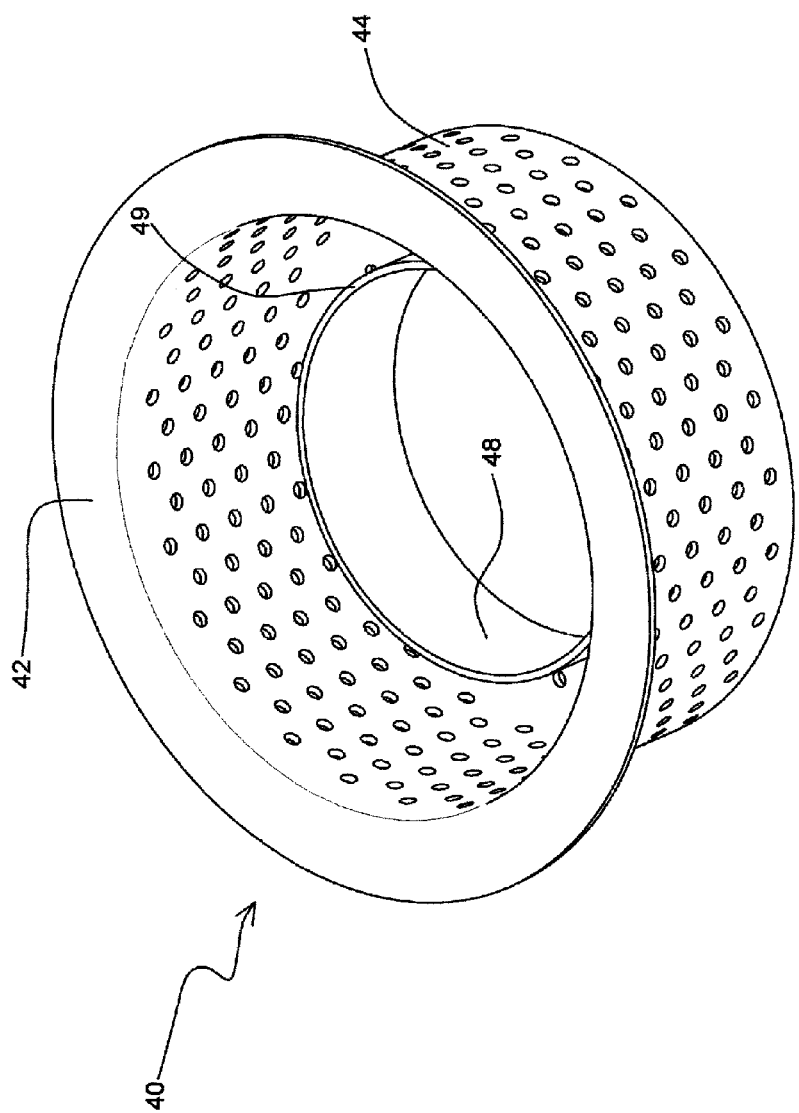
FIG. 4 is another perspective view of the muffler.

The RCV 10 includes a muffler 40 disposed in the annular cavity 26 that surrounds the valve member 30 and the axial flow passage 22. With reference to FIGS. 3 and 4 in particular, the muffler comprises a body defining:

- an annular flange 42 at a first end of the body and encircling the axis A;
- a generally cylindrical, perforated outer wall 44 extending axially from the flange 42 and terminating at an opposite second end of the body;
- an annular end wall 45 joined to an end of the outer wall 44 at the second end of the body, the end wall extending radially inwardly from the end of the outer wall and terminating at a radially inner periphery 46 of the end wall; and
- a generally cylindrical, non-perforated inner wall 48 joined to the inner periphery 46 of the end wall 45 and axially extending toward the first end of the body and terminating at an upper end 49 located intermediate the first and second ends of the body.

The muffler 40 is disposed such that when the valve member 30 is in the open position, the compressed recirculation air is constrained to flow along the non-perforated inner wall 48 and past the upper end 49 thereof before reaching and flowing radially outwardly through the perforated outer wall 44 to the transverse flow passage 28. The transverse flow passage 28 is arranged to feed the air into an inlet of the compressor.

The disposition of the non-perforated inner wall 48 constrains the air to flow along the inner wall and reduces the velocity of the air that reaches the perforated outer wall 44. Significant noise reduction of the RCV is expected, relative to a comparable RCV without the muffler 40.

Persons skilled in the art, on the basis of the present disclosure, will recognize that modifications and other embodiments of the inventions described herein can be made without departing from the inventive concepts described herein. For example, in the illustrated embodiment, the annular end wall 45 of the muffler is perforated, but alternatively it can be non-perforated. The valve housing 20 in the illustrated embodiment also defines, or at least partially defines, the volute V for the compressor, and there is a passage (not visible in the cross-sectional views of FIGS. 1 and 2) that connects the volute V to the chamber 21 of the valve housing. In this sense, the valve housing can be at least partly integrated in the compressor housing. Alternatively, however, the valve housing can be a separate component that does not define any of the compressor features.

Specific terms used herein are employed for explanatory purposes rather than purposes of limitation. Accordingly, the inventions are not to be limited to the specific embodiments disclosed, and modifications and other embodiments are intended to be included within the scope of the appended claims. Other variations that do not depart from the described inventive concept are also included within the scope of the appended claims.

What is claimed is:

1. A recirculation valve for a turbocharger compressor, comprising:
    a valve housing defining:
        an axial flow passage for compressed recirculation air extending along a direction defined by an axis of the recirculation valve;
        an annular valve seat encircling the axis;
        an annular cavity surrounding the axial flow passage, the annular cavity being in fluid communication with the axial flow passage; and
        a transverse flow passage in fluid communication with the annular cavity;
    a valve member disposed in the axial flow passage and linearly movable along the axis between a closed position wherein an end of the valve member contacts the valve seat, and an open position wherein the end of the valve member is axially spaced from the valve seat; and
    a muffler disposed in the annular cavity, the muffler comprising a body defining:
        an annular flange at a first end of the body and encircling the axis;
        a cylindrical, perforated outer wall extending axially from the flange and terminating at a second end of the body;
        an annular end wall joined to an end of the outer wall at the second end of the body, the annular end wall extending radially inwardly from the end of the outer wall and terminating at a radially inner periphery of the annular end wall; and
        a cylindrical, non-perforated inner wall joined to the radially inner periphery of the annular end wall and axially extending toward the first end of the body and terminating at an upper end located intermediate the first and second ends of the body;
    wherein the muffler is disposed such that when the valve member is in the open position, the compressed recirculation air is constrained to flow along the non-perforated inner wall and past the upper end thereof before reaching and flowing radially outwardly through the perforated outer wall to the transverse flow passage.

2. The turbocharger of claim 1, wherein the annular end wall of the muffler is perforated.

3. The turbocharger of claim 1, wherein the valve housing defines a chamber for receiving compressed air to be recirculated, the chamber being connected to the axial flow passage.

4. The turbocharger of claim 3, wherein the valve housing further defines a volute for the compressor.

* * * * *